US010605298B2

(12) United States Patent
Zavala Riva Palacio

(10) Patent No.: US 10,605,298 B2
(45) Date of Patent: Mar. 31, 2020

(54) SNAP HOOK WITH SPRING

(71) Applicant: Manuel Zavala Riva Palacio, Colonia del Valle (MX)

(72) Inventor: Manuel Zavala Riva Palacio, Colonia del Valle (MX)

( * ) Notice: Subject to any disclaimer, the term of this patent is extended or adjusted under 35 U.S.C. 154(b) by 0 days.

(21) Appl. No.: 15/321,990

(22) PCT Filed: Jun. 19, 2015

(86) PCT No.: PCT/MX2015/000097
§ 371 (c)(1),
(2) Date: Dec. 23, 2016

(87) PCT Pub. No.: WO2015/199528
PCT Pub. Date: Dec. 30, 2015

(65) Prior Publication Data
US 2017/0130762 A1  May 11, 2017

(30) Foreign Application Priority Data

Jun. 23, 2014 (MX) ................. MX/a/2014/007736

(51) Int. Cl.
*F16B 45/04* (2006.01)
*A44B 13/02* (2006.01)

(52) U.S. Cl.
CPC .............. *F16B 45/04* (2013.01); *A44B 13/02* (2013.01)

(58) Field of Classification Search
CPC .................................. F16B 45/04; A44B 13/02
See application file for complete search history.

(56) References Cited

U.S. PATENT DOCUMENTS 275,266 A    4/1883  Pullman
275,537 A *  4/1883  Straw ..................... F16B 45/04
                                                    24/600.8

(Continued)

FOREIGN PATENT DOCUMENTS

DE    20320167 U1   4/2004
EP     0170903 A1  12/1986

(Continued)

OTHER PUBLICATIONS

International Search Report and Written Opinion of the International Searching Authority for International Patent Application No. PCT/MX2015/000097 dated Jun. 19, 2015, with English translation of the International Search Report, 12 pages.

(Continued)

*Primary Examiner* — Jason W San
(74) *Attorney, Agent, or Firm* — Alston & Bird LLP

(57) ABSTRACT

A snap hook with spring may include a main body having a first generally curved shape section and a second generally straight shape section. The generally curved section may include a hole, and the generally straight section may include a cavity. The snap hook with spring may also include a sliding pin and a spring acting on said sliding pin. The snap hook with spring may also be characterized in that a slide formed in the main body may have various geometrical shapes leading to a path, where the path includes sections that may be linear, rotational, curved, angular, or any combination thereof. The sliding pin may include a lever that runs the path of the slide and the path of the slide determines the type of movement of the sliding pin, in such a way that the path of the slide is never limited to a single direction.

17 Claims, 12 Drawing Sheets

(56) References Cited

U.S. PATENT DOCUMENTS

| | | | | |
|---|---|---|---|---|
| 424,166 | A * | 3/1890 | Bodenstein | B62C 5/04 24/600.7 |
| 647,714 | A * | 4/1900 | Baker | F16B 45/04 24/600.8 |
| 701,586 | A * | 6/1902 | Levitt | F16B 45/04 24/600.7 |
| 759,794 | A * | 5/1904 | Zerbe | F16B 45/04 24/598.4 |
| 759,805 | A * | 5/1904 | Broga | F16B 45/04 24/600.7 |
| 759,806 | A * | 5/1904 | Broga | F16B 45/04 24/600.7 |
| 1,250,596 | A * | 12/1917 | Kuhns | F16B 45/04 24/600.7 |
| 1,388,557 | A * | 8/1921 | Gerhard | F16B 45/04 24/600.7 |
| 1,660,028 | A * | 2/1928 | Baxter | F16B 45/04 24/600.7 |
| 4,689,860 | A * | 9/1987 | Suchowski | A01K 27/005 24/600.7 |
| 7,526,843 | B2 * | 5/2009 | Lin | F16B 45/04 24/600.2 |
| 8,365,365 | B2 * | 2/2013 | Schlipper | F16B 45/04 24/265 H |
| 9,206,836 | B2 * | 12/2015 | DeBien | F16B 45/02 |
| 2015/0226254 | A1 * | 8/2015 | Nonoguchi | A01K 27/005 24/524 |
| 2016/0165850 | A1 * | 6/2016 | Nakata | A01K 27/005 24/374 |

FOREIGN PATENT DOCUMENTS

| | | |
|---|---|---|
| JP | 3169700 U | 8/2011 |
| WO | WO-2009/037793 A1 | 3/2009 |

OTHER PUBLICATIONS

Extended European Search Report for European Application No. 15811030.4 dated Jan. 15, 2018.

Intention to Grant European Patent Application No. 15811030.4 dated Nov. 2, 2018.

International Preliminary Search Report for International Application No. PCT/MX2015/000097 dated Sep. 16, 2016.

Extended European Search Report for European Application No. 15811030.4 dated Jan. 1, 2018.

* cited by examiner

SNAP HOOK WITH SPRING

CROSS-REFERENCE TO RELATED APPLICATIONS

This application is a national stage application filed under 35 U.S.C. § 371 of International Application No. PCT/MX2015/000097 filed Jun. 19, 2015, which claims priority to Mexican Application No. MX/a/2014/007736, filed Jun. 23, 2014, which applications are hereby incorporated by reference in their entirety.

DISCLOSURE OF THE INVENTION

The present invention relates to the field of the fasteners or accessories for fastening in the leather goods industry as well as their equivalents in other materials.

The invention comprises a snap hook with spring, also known as snap hook or snap link that comprises basically three components: a main body, a sliding pin or locking pin, and a spring that acts on such sliding or locking pin and maintains the snap hook with spring closed.

In the present invention, the movement of the sliding pin is not completely linear as in existing designs, it is partly linear and it is enabled with at least one change in the type of movement that allows the sliding pin to rotate; this change or changes in the type of movement make more difficult to open the new design unintentionally of the snap hook with spring compared to existing designs.

Currently, there is a need to increase the safety of the objects fastened by means of known devices such as snap hook or snap link, nowadays, these devices are likely to open accidentally or involuntarily, causing that the fastened element may fall and thus be lost; the above is derived, partly, from the path of the opening of the snap hooks being regularly linear which is shown in the state of the art cited below among many other precedents.

The U.S. Pat. No. 1,250,596 shows a hook where the path of a bolt, by manually actuating a stud achieves its opening, wherein the opening movement is only a linear movement, causing said hook to lack safety as it may be easily opened accidentally by a pull on the stud.

The U.S. Pat. No. 1,388,557 is another hook provided to fasten some element, however, the displacement of the bolt may be accidentally generated with the vibration of the hook itself; causing said hook to lack safety for the fastening of the element that is being carried, in addition to the only possible movement of the bolt that is a linear movement.

The hook showed in the U.S. Pat. No. 1,660,028 which bolt moves, as well as in the other inventions of the state of art cited, over a slot, the movement generated by the opening and closing is an only linear movement.

The German Patent No. 203 20 167 U1 shows a hook wherein the bolt opens or closes the hook by a linear movement, but the bolt and the stud that drags them are not made in a single part.

In the U.S. Pat. No. 7,526,843 B2 is shown another type of hook where a bolt and its lever are a single part; the opening and closure of the hook are achieved with a single linear movement over the slide.

It is noteworthy that the state of the art cited either individually or the combination thereof do not come from or entail in its design the safety warranty of preventing the accidental or involuntary opening of the rope slings or snap hooks, so the fastening of the fastened object is not guaranteed with high safety.

The snap hook with spring of the present invention overcomes such disadvantages by forcing the displacement of a sliding pin to have various movements: linear, rotational or any combination thereof, these movements prevent the accidental opening of the hook thus achieving the safety that the snap hook with spring will remain closed in a more reliable way.

Therefore, it is a main object of the present invention to provide a snap hook with spring for making the fastening of articles more secure by preventing the accidental displacement of the sliding pin.

According to the present invention, the snap hook with spring comprises a main body, a sliding pin, and a spring.

It is, therefore, a further object of the invention that the main body has two sections, wherein one of them has a generally curved shape and the other has a generally straight shape with a cavity that enables the insertion of an end of the sliding pin and the spring. The generally curved shape section has a hole wherein one of the ends of the sliding pin is housed in closing condition; it can also refer to the generally curved shape section as the upper section or upper part.

Another object of the present invention is that the main body contains a slide; the slide may have various geometrical shapes that led to a travel or a path, such path comprised of sections, the sections of the path may be linear or rotational or curved or angular and so on or any combination thereof.

Due to the fact that the sections can be many and very varied, by joining them, it can be obtained at least one path for the slide in this invention.

Another object of the present invention is that the sliding pin comprises a lever, the lever is part of the sliding pin. The lever contributing to the opening or closing operation of the snap hook with spring by running the path of the slide, and the path of the slide determines the type of movements, linear, rotational or any combination thereof of the sliding pin.

An important feature of this invention related to the slide is that its path in never limited to a single direction.

Another object of the invention is to begin the opening process of the snap hook with spring, by starting the movement of the lever a sliding pin movement begins, wherein the end of the sliding pin is still partially housed in the hole located in the generally curved shape section of the main body during the first stage(s) of movement of the sliding pin.

Another object of the invention is that the lever continues to move according to the path of the slide, wherein direction changes in the path are present causing changes in the movement type in the sliding pin. The changes in the movement type of the sliding pin may be from a linear movement to a rotational movement or from a rotational movement to a linear movement or any combination thereof.

Another object of the invention is that at the end of the sliding pin linear and/or rotational movements and/or a combination thereof, the end of the sliding pin is got out from the hole located in the upper section of the main body enabling the snap hook with spring to open.

It is important to note that the linear movements and the rotational movements which the sliding pin may have as a result of the changes of direction in the path of the slide are not necessarily independent on each other, i.e. both movements can occur simultaneously.

Another object of the present invention is that the sliding pin has travel movements with respect to the main body and these travel movements are to open the snap hook with spring. To close the snap hook with spring, the travel movements are opposite to those made to open it.

Another object of a second embodiment of the present invention is that it may have another safety option through a safety element consisting of a stop, which is a part of the main body and blocks the free movement of the sliding pin.

In this second embodiment, the slide is shaped in such main body which may have various geometrical shapes that result in a travel or path, the path may be comprised of one or more sections, the sections may be linear or rotational or curved or angular or any combination thereof.

It is, therefore, a further object of the invention that the main body has two sections, wherein one of them has a generally curved shape and the other has a generally straight shape with a cavity that enables the insertion of an end of the sliding pin and the spring.

This safety element works in the following way:

The main body has a stop

The sliding pin has a movable part engaged to it; the movable part is engaged in various possible ways to a lever that is part of the sliding pin and this engagement enables the movable part to have opening and closing movements that enable to change its position.

The movable part assembly with the lever of the sliding pin has a resilient element (spring, coil, and so on) that maintains the movable part in a closed position.

By making its first movement the sliding pin, that is a rotational movement, the movable part engaged to the lever of the sliding pin in its closed position makes contact with the stop preventing the rotation of the sliding pin; the lever of the sliding pin do not contact the stop, i.e. the lever travels by the sliding pin movement and the lever in its travel is always outside the blockage area of the stop.

The movable part may change its closed position and by doing so it makes that in its new open position, the movable part does not contact the stop any more and enabling the sliding pin to move freely.

After passing the stop, the movable part returns to its closed position and may follow the remaining path of the slide to open the snap hook with spring.

It is important to note that the linear movements and the rotational movements the sliding pin may have as a result of the direction changes in the path of the slide are not necessarily independent from each other, i.e. both movements can occur simultaneously.

The stop may have any shape provided that meets the function of blocking the free movement of the sliding pin due to the fact that the movable part in closed position makes contact with it.

In this second embodiment, the stop is located blocking the first movement of the sliding pin wherein the first movement of the sliding pin is a rotational movement. In this first rotational movement of the sliding pin, the rotation of the lever is carried out outside the slide.

After passing the stop and completing this first rotational movement, the sliding pin engages in the slide and runs the path of this to open the snap hook with spring.

In this second embodiment, the main body does not have a hole in the generally curved shape section where the end of the sliding pin may be housed, the end of it contacts the main body by means of the spring maintaining the snap hook with spring closed.

Another object of the invention is that the embodiments presented above are not mutually exclusive each other, so there may be a snap hook with spring with features of both embodiments presented.

In the state of the art cited, a uniformity in the use of the hook, pin, and spring is basically showed; wherein the use of the same components in the operation of such inventions, either individually or in combination, do not warranty the opening and closing safety which now is greatly improved with the snap hook with spring of the present invention.

In the snap hook with spring, the functionality of the hook, pin, and spring in combination with the displacements therebetween, enable the snap hook with spring to be novel and inventive with respect to the state of the art cited therefore generating features of greater safety that preceding inventions lack and are not shown in any step of their descriptions, claims or drawings.

The combination of the elements that are part of the snap hook with spring and the variety of movements of the elements comprising the invention are described as following in one embodiment of the invention.

Figure 1:
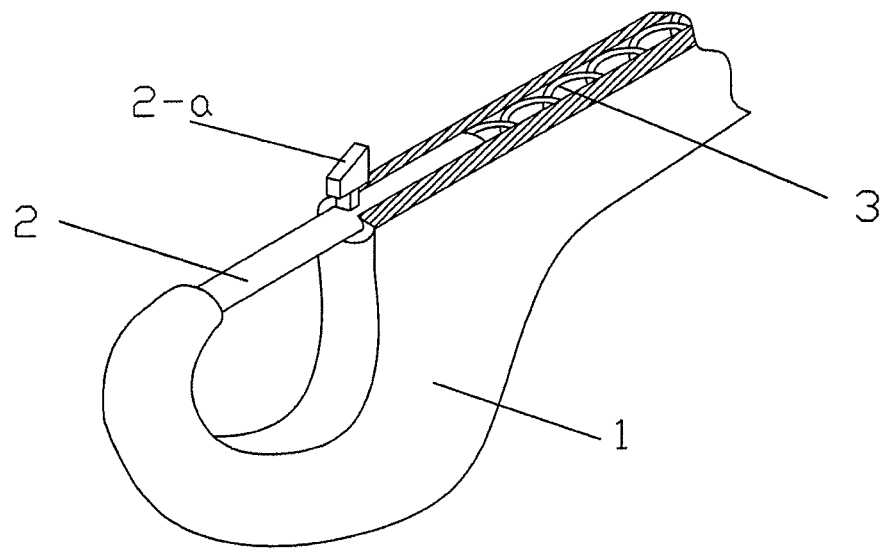
FIG. 1 is a schematic diagram showing a isometric view of some components of the snap hook with spring.

FIG. 1 shows the snap hook with spring comprised of the components: a main body (1), a sliding pin (2), a spring (3); the lever (2-*a*) is part of the sliding pin (2), wherein the snap hook with spring is in a closed position.

Figure 2:
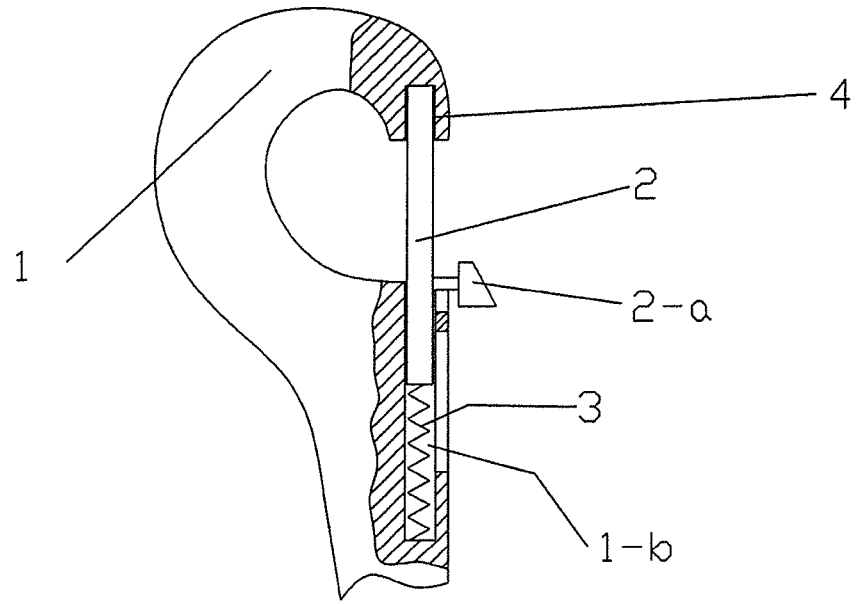
FIG. 2 is a schematic diagram showing a cross-sectional view of the components of the snap hook with spring.

FIG. 2 is a cross-sectional view of the main body (1) showing the components of the snap hook with spring which enable to appreciate the closed position of the snap hook with spring, the sliding pin (2) and the spring (3) which exerts a force on the sliding pin (2) that holds the snap hook with spring in a closed position, wherein it is shown that an end of the sliding pin (2) is inside the hole (4), wherein the hole (4) is part of the main body (1), and that the other end of the sliding pin (2) is positioned inside the cavity (1-*b*) of the main body (1).

Figure 3:
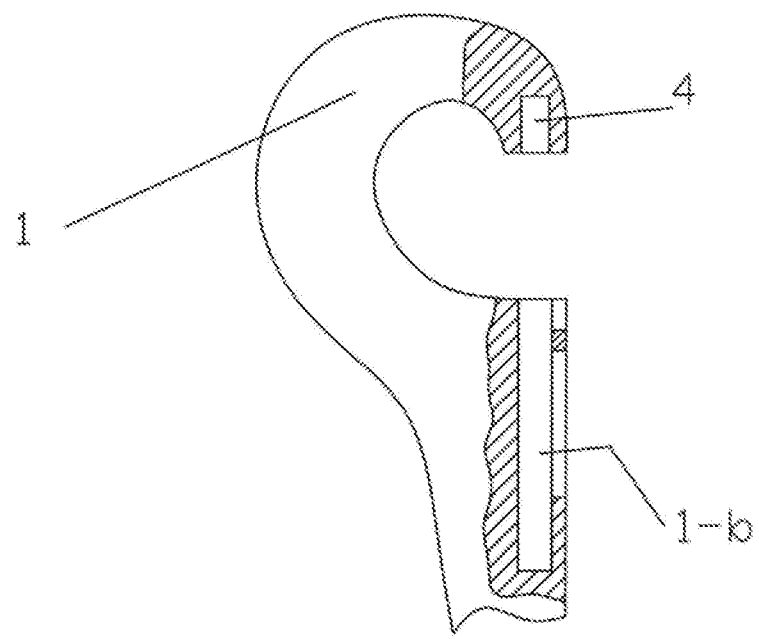
FIG. 3 is a schematic diagram showing in cross-section in the main body.

FIG. 3 shows a cross-section of the main body (1), showing that it has a hole (4) which houses the end of the sliding pin (2) in the closed position of the invention and a cavity (1-*b*) which houses the other end of the sliding pin (2). The end of the sliding pin (2) will remain partially inside the hole (4) during the first stage(s) of the travel of the sliding pin (2) in the opening process of the invention.

The movement of travel that the sliding pin (2) may have is variable in its type of movement, either to open or close the snap hook with spring, causing that the sliding pin (2) has, at least, a rotational movement with respect to the main body (1) and also, as a part of its travel movement one or more linear movements with respect to the main body (1). These movements of the sliding pin (2) are a consequence of the geometric shape of the slide (1-*a*) and the lever (2-*a*) running through the path of the slide (1-*a*).

Figure 4:
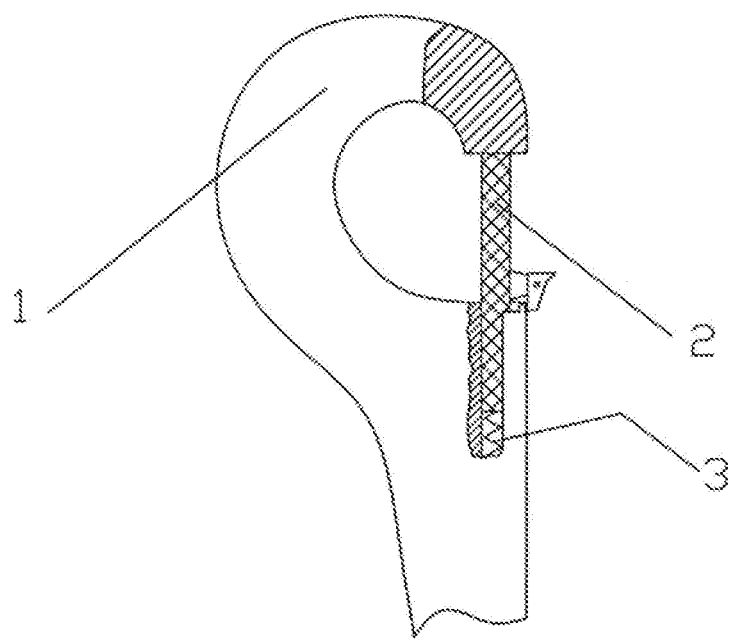
FIG. 4 is a schematic diagram showing another embodiment of the snap hook with spring.

FIG. 4 is a second embodiment of the snap hook with spring that will be described later.

FIGS. 5-16 show the sequence of movements of the sliding pin (2) and of the lever (2-*a*) for the opening of the snap hook with spring with the slide (1-*a*) design illustrated in them, according to one of the embodiments of the invention.

Figure 5:
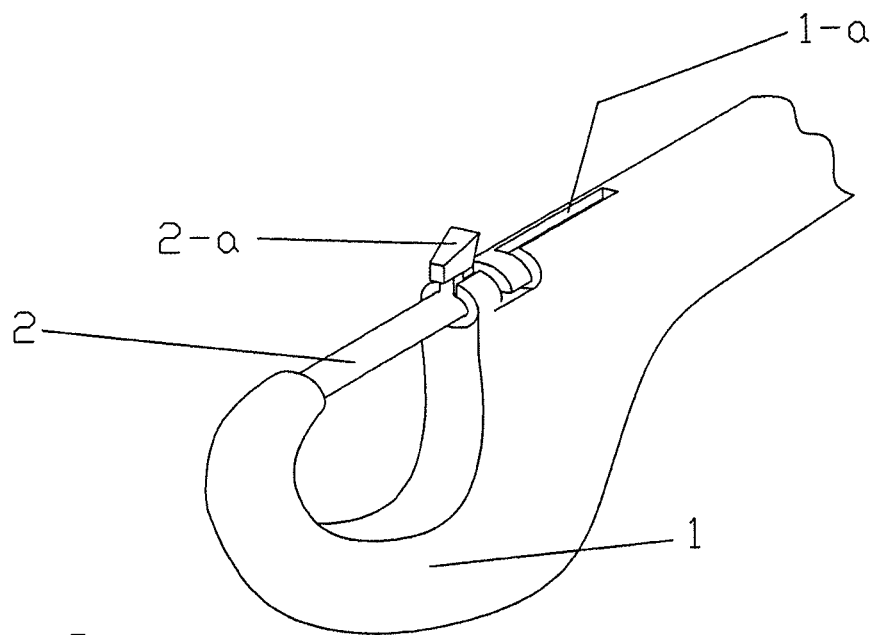
FIG. 5 is a schematic diagram showing a view of some components in an opening travel stage.

FIG. 5 shows a snap hook with spring in a closed position, in this figure the slide (1-*a*) is shown.

Figure 6:
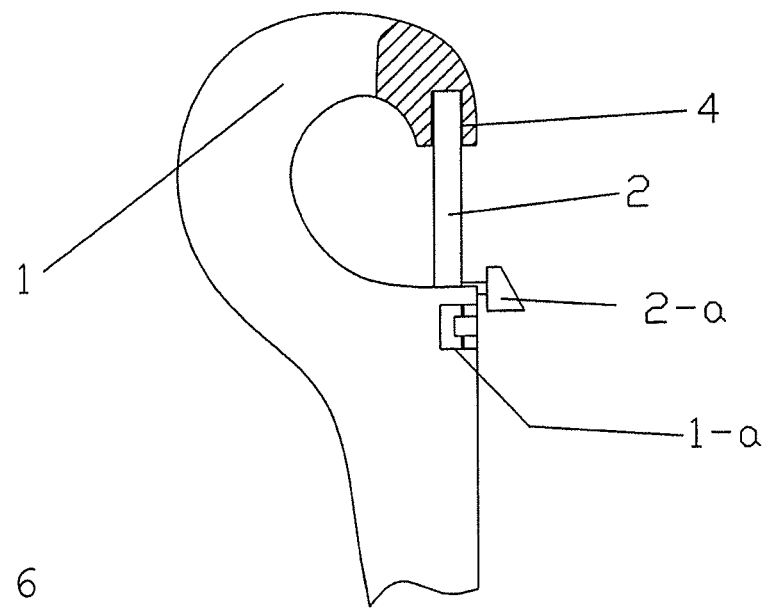
FIG. 6 is a schematic diagram showing an another view of FIG. 5 with a cross-section at the upper part of the main body.

FIG. 6 is the same stage as FIG. 5 and shows a cross-sectional of the upper part of the main body (1), it is clearly appreciated how the end of the sliding pin (2) is housed inside the hole (4) contained in the main body (1).

Figure 7:
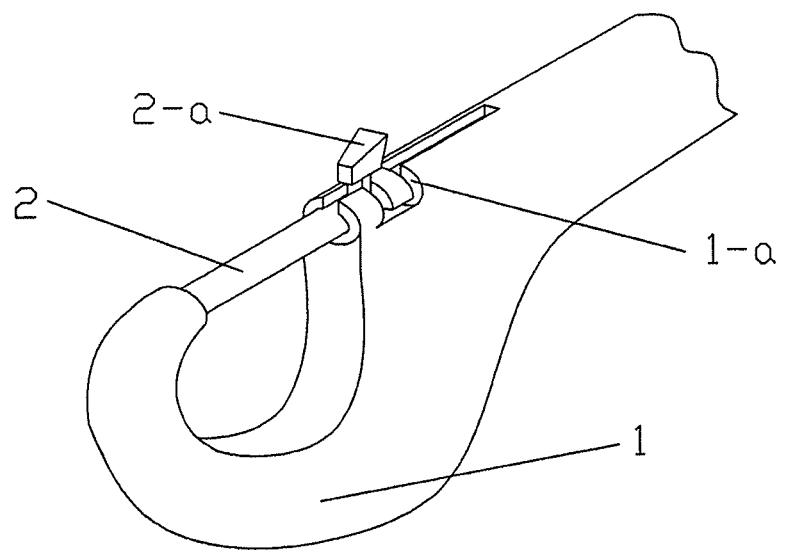
FIG. 7 is a schematic diagram showing a view of some components of the snap hook with spring in an opening travel stage.

FIG. 7 shows the snap hook with spring after the first linear movement until it is stopped by the geometric shape of the slide (1-*a*).

Figure 8:
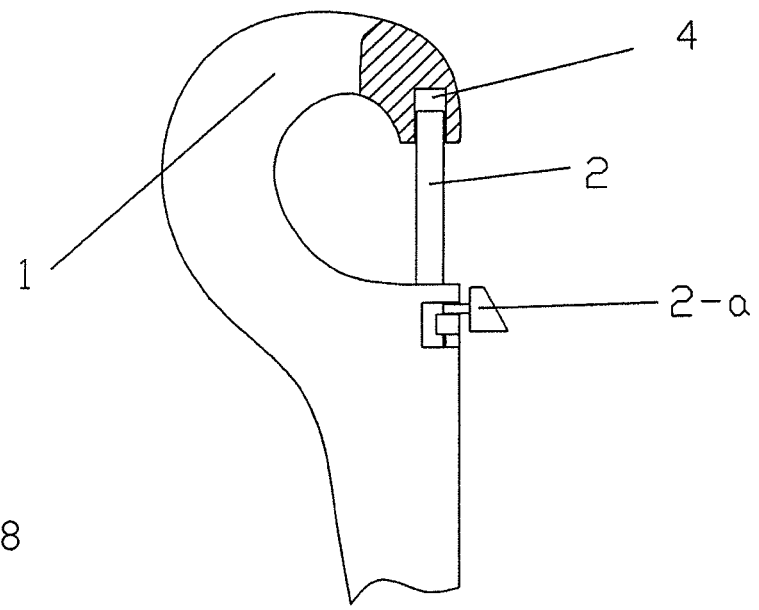
FIG. 8 is a schematic diagram showing an another view of FIG. 7 with a cross-section at the upper part of the main body.

FIG. 8 shows a cross-sectional of the main body (1) after the first linear movement of the sliding pin (2), wherein the end of the sliding pin (2) is still partially housed in the hole (4) of the main body (1).

Figure 9:
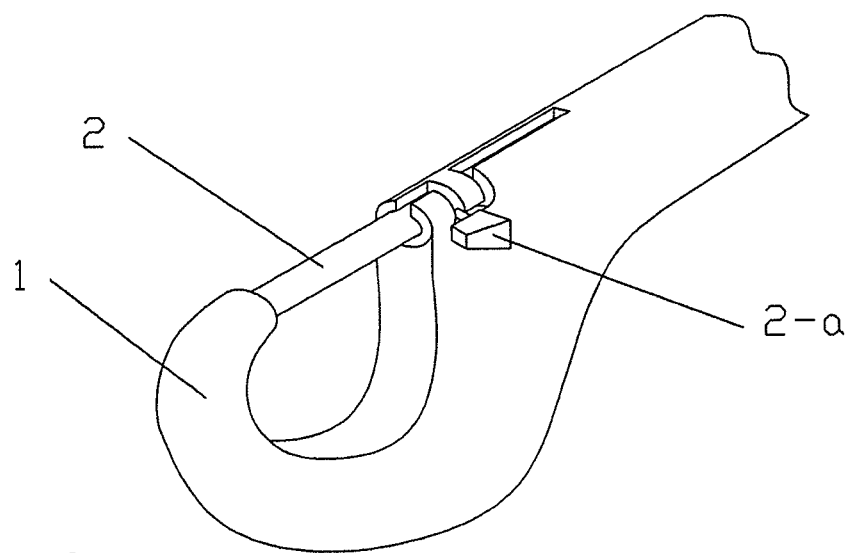
FIG. 9 is a schematic diagram showing a view of some components of the snap hook with spring in an opening travel stage.

FIG. 9 shows the snap hook with spring in a stage which comes after a rotational movement of the sliding pin (2) as a result of the lever (2-*a*) traveling the path of the slide and a change in the direction of the path.

Figure 10:
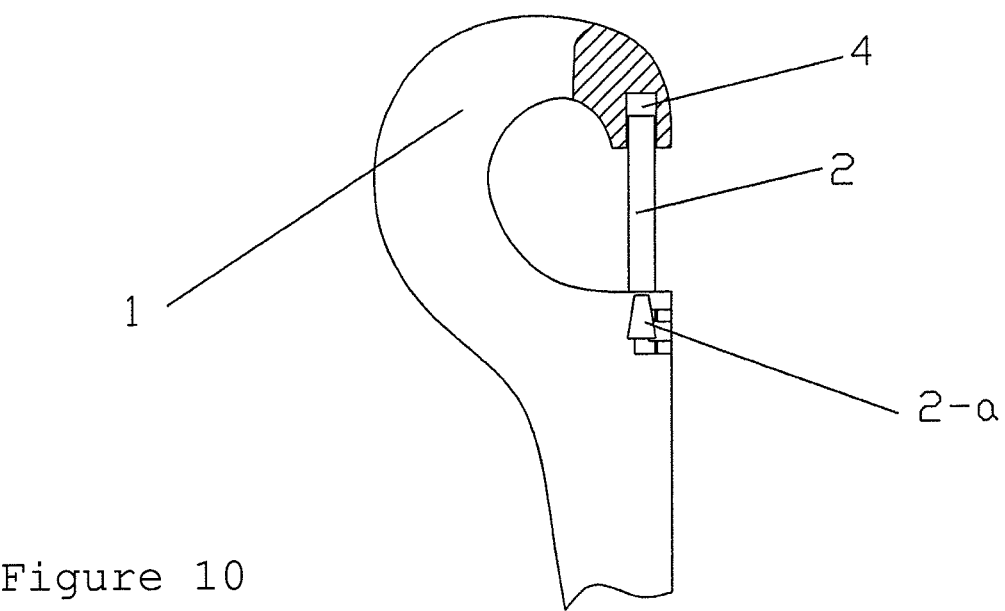
FIG. 10 is a schematic diagram showing an another view of FIG. 9 with a cross-section at the upper part of the main body.

FIG. 10 shows a cross-sectional of the main body (1) in the same stage as FIG. 9, wherein the end of the sliding pin (2) is still partially housed in the hole (4) of the main body (1).

Figure 11:
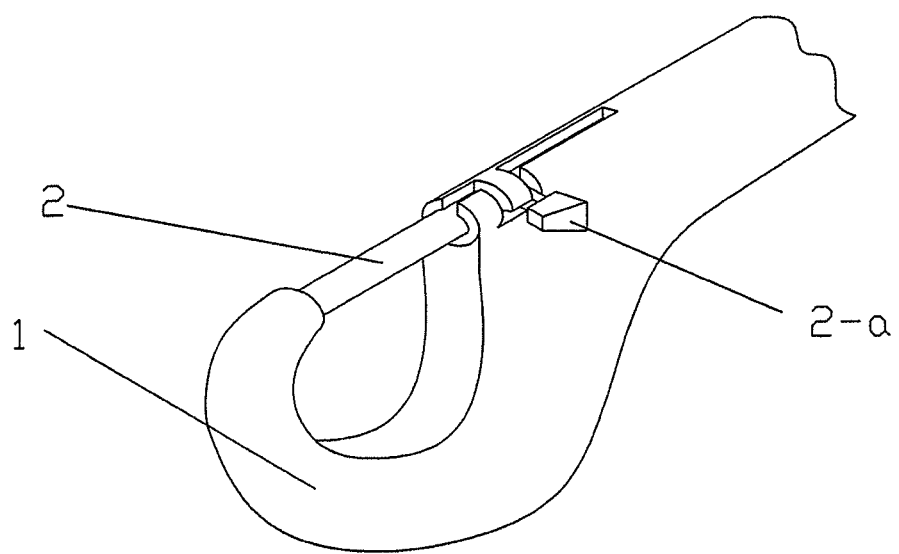
FIG. 11 is a schematic diagram showing a view of some components of the snap hook with spring in an opening travel stage.

FIG. 11 shows the snap hook with spring in a stage which comes after a linear movement of the sliding pin (2) as a result of the lever (2-*a*) traveling the path of the slide and a change in the direction of the path.

Figure 12:
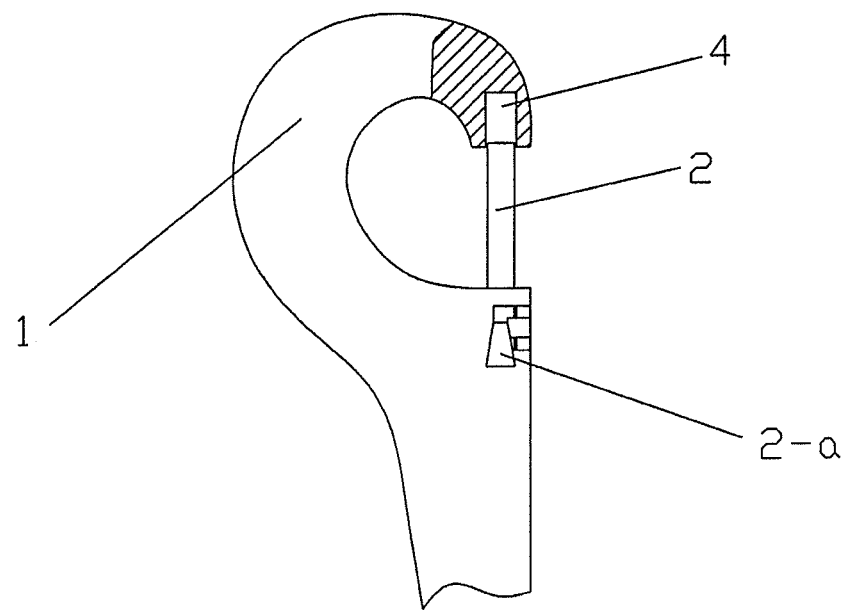
FIG. 12 is a schematic diagram showing an another view of FIG. 11 with a cross-section at the upper part of the main body.

FIG. 12 shows a cross-sectional of the upper part of the main body (1), in the same stage as FIG. 11, wherein the end of the sliding pin (2) is still partially housed in the hole (4) of the main body (1).

Figure 13:
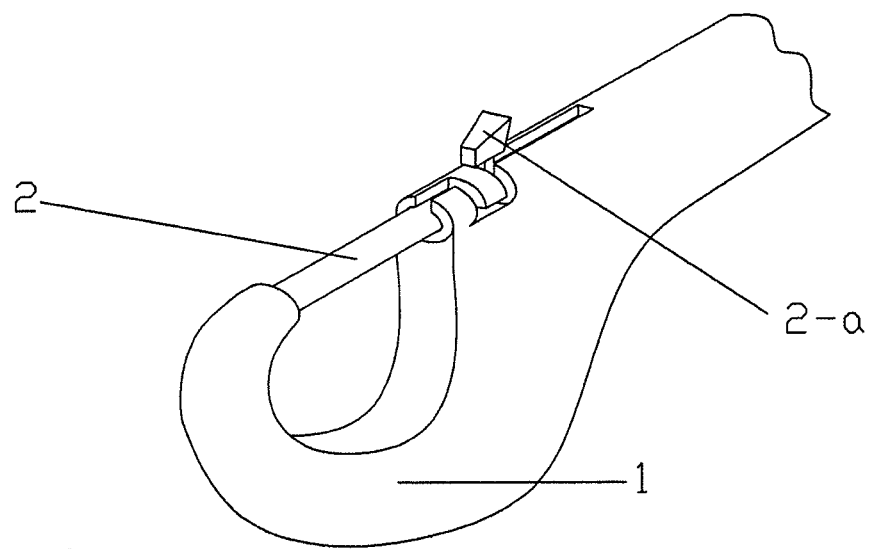
FIG. 13 is a schematic diagram showing a view of some components of the snap hook with spring in an opening travel stage.

FIG. 13 shows the snap hook with spring in a stage which comes after a rotational movement of the sliding pin (2) as a result of the lever (2-*a*) traveling the path of the slide and a change in the direction of the path.

Figure 14:
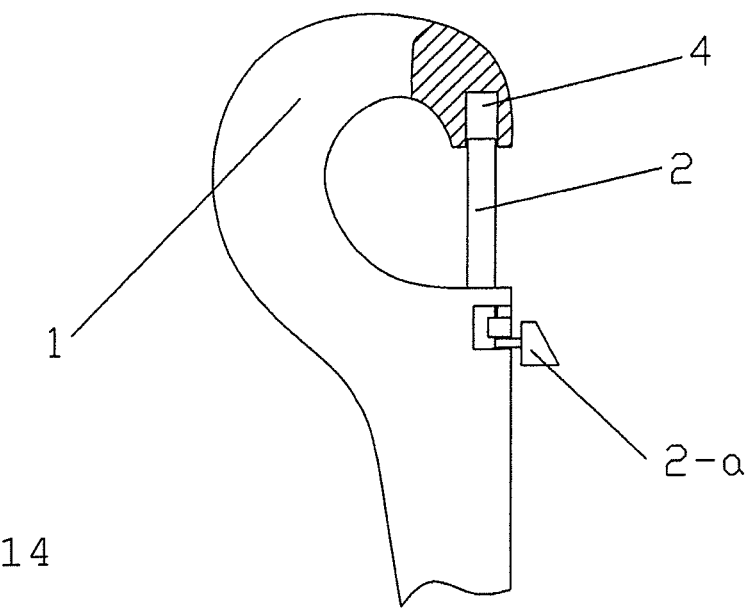
FIG. 14 is a schematic diagram showing an another view of FIG. 13 with a cross-section at the upper part of the main body.

FIG. 14 shows a cross-sectional of the upper part of the main body (1), in the same stage as FIG. 13, wherein the end of the sliding pin (2) is still partially housed in the hole (4) of the main body (1).

Figure 15:
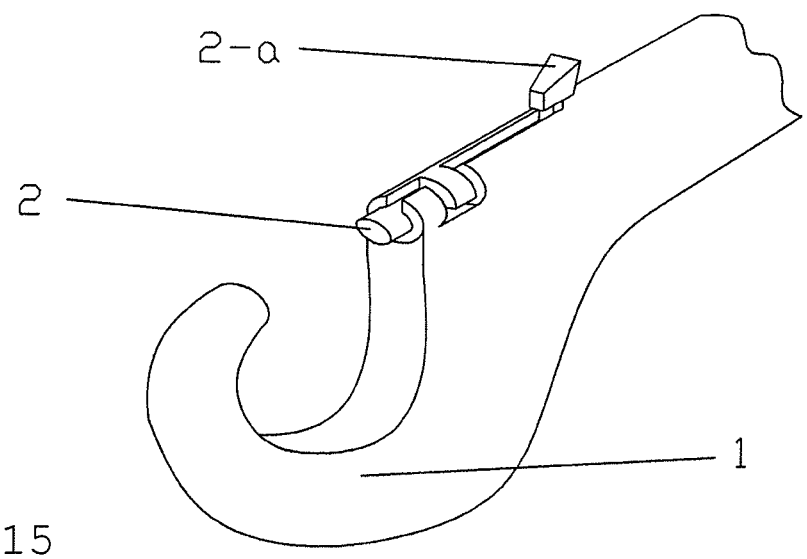
FIG. 15 is a schematic diagram showing a view of some components of the snap hook with spring in an opening travel stage.

FIG. 15 shows the snap hook with spring in a stage which comes after a linear movement of the sliding pin (2) as a result of the lever (2-*a*) traveling the path of the slide and a change in the direction of the path, enabling the end of the sliding pin (2) to be outside the hole (4) and accordingly, the snap hook with spring is in an open position.

Figure 16:
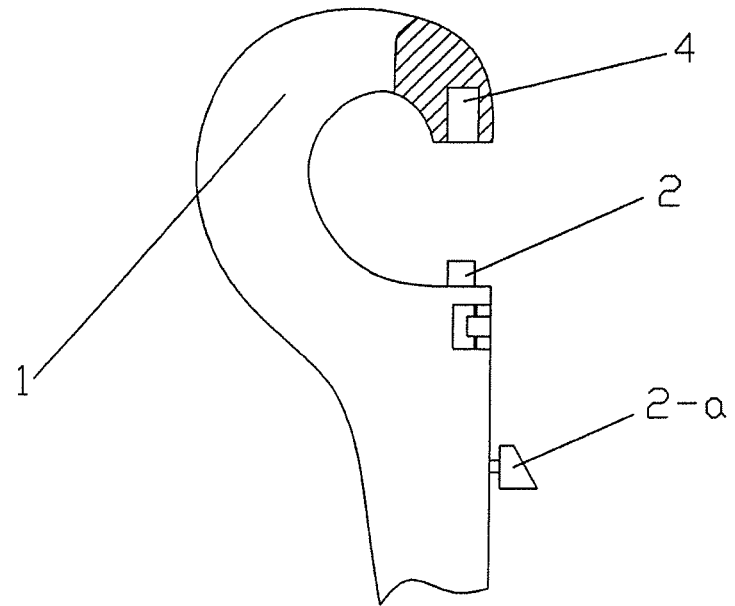
FIG. 16 is a schematic diagram showing an another view of FIG. 15 with a cross-section at the upper part of the main body.

FIG. 16 shows a cross-sectional of the upper part of the main body (1), showing the same stage as FIG. 15, wherein this stage of the opening displacement, the end of the sliding pin (2) is outside the hole (4) of the main body (1).

The path described above is only one example of a large number of possible travels, being the only requirement that the path of the slide has one or more direction changes.

Changes in the travel movement of the sliding pin (2) showed in FIGS. 5-16 occur by alternating linear movement and rotational movement.

As it can be noted with the changes in the type of movement of the sliding pin (2), it makes difficult for the invention to open accidentally, giving more safety to whatever the invention is holding.

Next, it will be described the second embodiment where the invention has a stop (6); it will be described this embodiment which the stop (6) is located blocking the first movement of the sliding pin (2), wherein this first movement of the sliding pin (2) is a rotational movement.

In this instance, the upper section of the main body (1) does not have a hole which may house the end of the sliding pin (2) in the closed position of the invention, its end contacts the main body (1), as illustrated in FIG. 4, keeping the snap hook with spring closed.

Figure 17A:
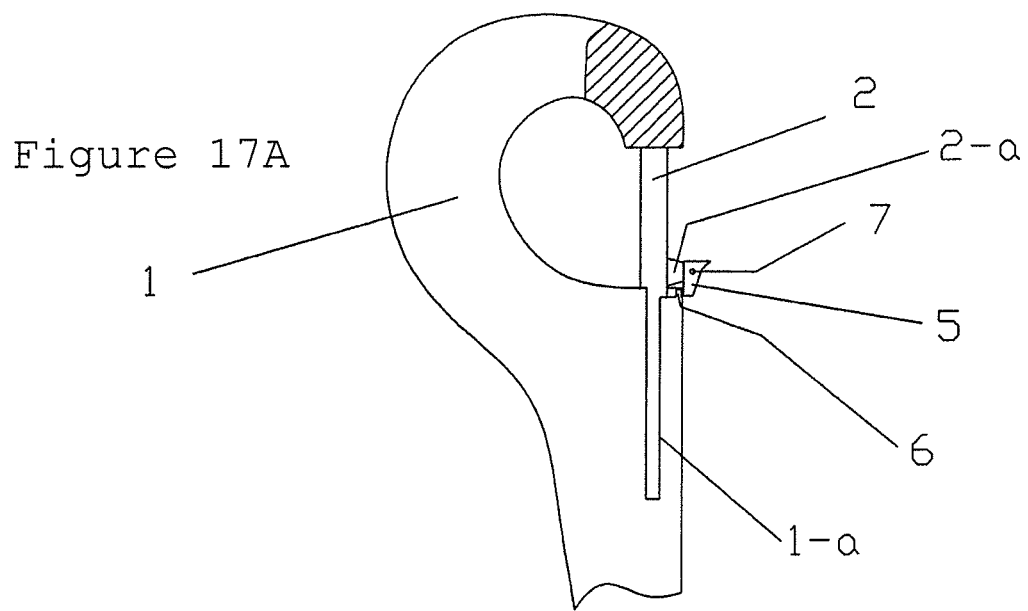
FIG. 17A is a schematic diagram showing an embodiment of the lever of the second embodiment.
Figure 17B:
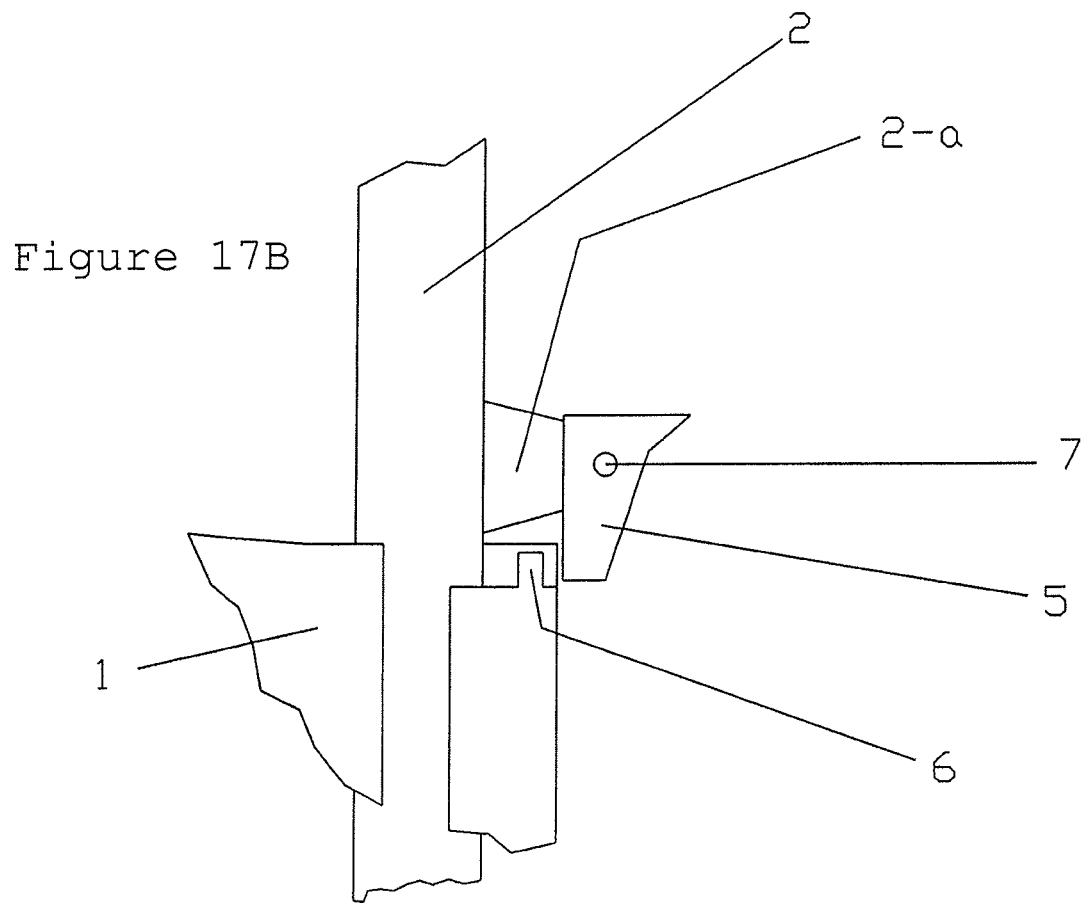
FIG. 17B is an enlarged view of one section of FIG. 17A.
Figure 18A:
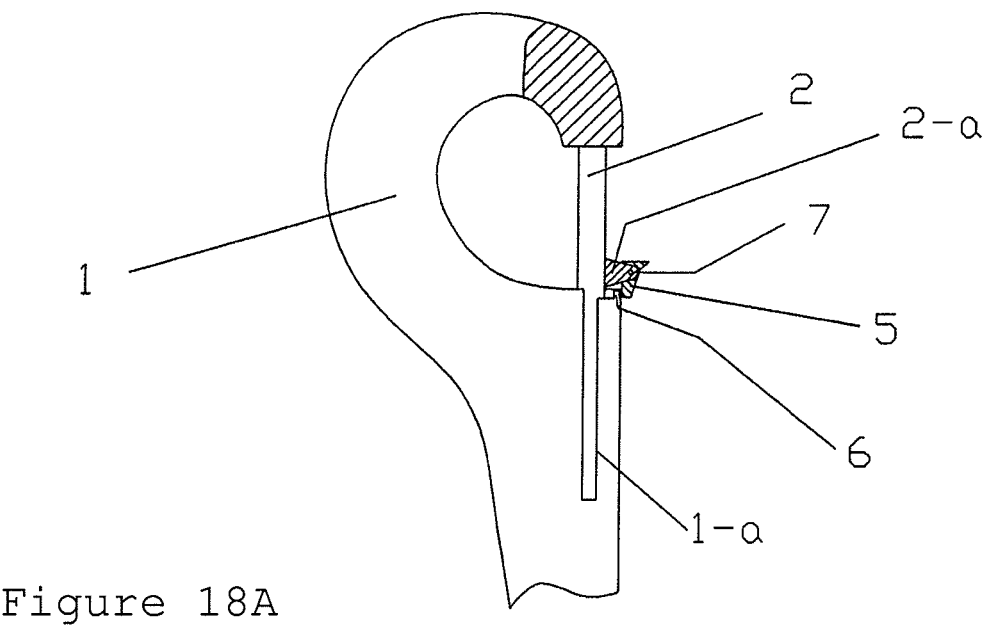
FIG. 18A is a schematic diagram showing another view of FIG. 17A with a cross-section of the lever, the movable part and the upper part of the main body.
Figure 18B:
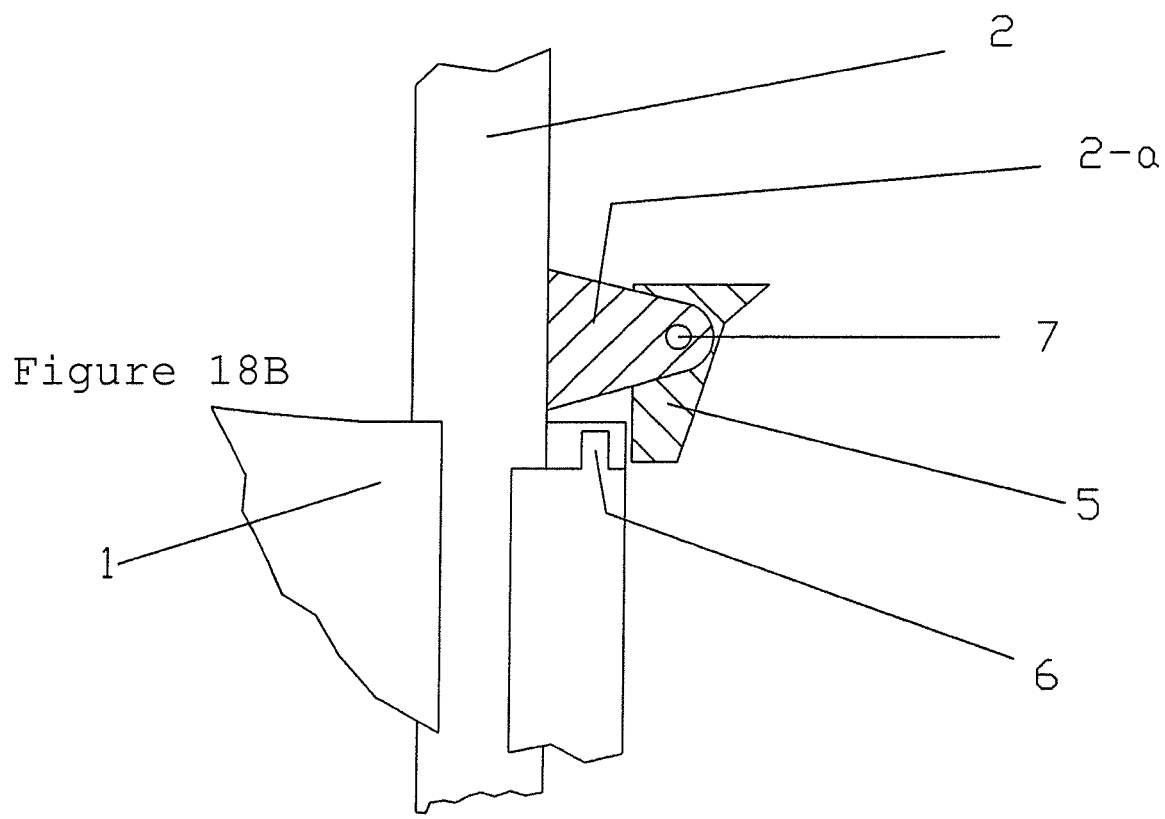
FIG. 18B is an enlarged view of one section of FIG. 18A.
Figure 19:
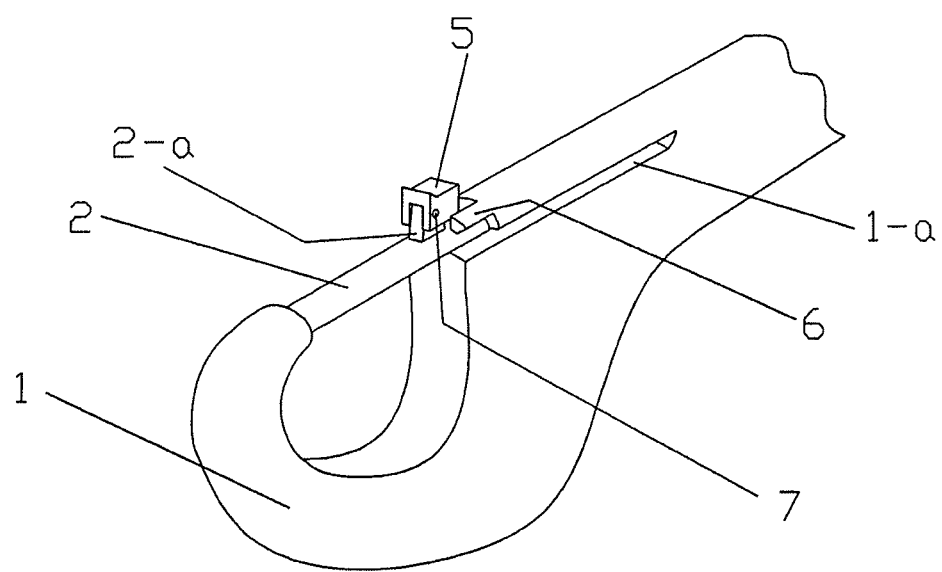
FIG. 19 is an isometric schematic diagram showing the second embodiment.

The option that comprises a stop as a safety element showed in FIG. 4 is illustrated in FIGS. 17A, 17B, 18A, 18B, 19, 20A, and 20B; in which the first movement is rotational and is not performed freely because a movable part (5), in FIGS. 17A and 17B, is engaged to a section of the sliding pin (2), being such section the lever (2-*a*). FIGS. 17A, 17B, 18A and 18B, show only an example of such above mentioned engagement through a pin (7), which is an illustrative example, but not limiting, of the possible engagement ways between the lever (2-*a*) of the sliding pin (2) with the movable part (5). The movable part (5) assembly with the lever (2-*a*) of the sliding pin (2) has a resilient element (spring, coil, and so on) (8) that maintains the movable part (5) in a closed position. Such that upon trying to rotate the sliding pin (2), the movable part (5) in its closed position, finds a stop (6) clearly depicted in FIG. 19; which may have different geometric shapes. The stop (6) prevent the free rotational movement of the movable part (5) and due to the movable part (5) is engaged to the lever (2-*a*) of the sliding pin (2), this cannot rotate; this stop is a part of the main body (1) design, the lever of the sliding pin (2) does not contact the stop when trying to rotate the sliding pin (2); this means that the lever makes its travel by the movement of the sliding pin and that the lever in its travel is always outside the blockage area of the stop.

In this variant of the second embodiment depicted in FIGS. 17A, 17B, 18A, 18B, 19, 20A, and 20B, the movable part (5) will have a rotational and/or linear movement or a combination thereof with respect to the sliding pin (2), this rotational and/or linear movement or combination thereof is due to a change in the movable part (5) from the closed position to the open position; and through this movement, it enables the movable part (5) to change position and in this new position of the movable part (5) it enables the free rotation of the movable part (5) and the sliding pin (2) over the stop (6), thus having a free rotational movement of the sliding pin (2) and of the movable part (5) with respect to the main body (1), from this point on, the slide may have any geometric shape.

Figure 20A:
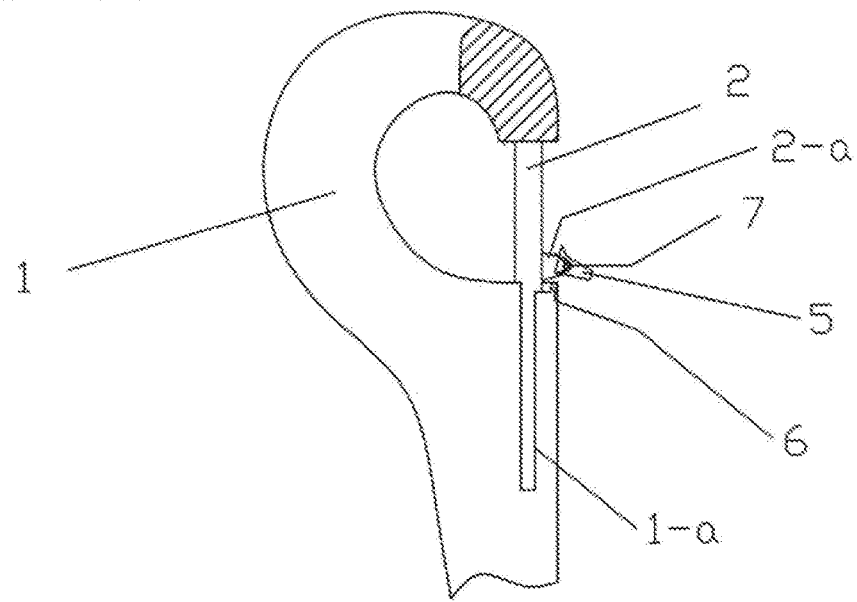
FIG. 20A is a schematic diagram showing the lever in a position different from that of FIG. 17A with a cross-section in the upper part of the main body.
Figure 20B:
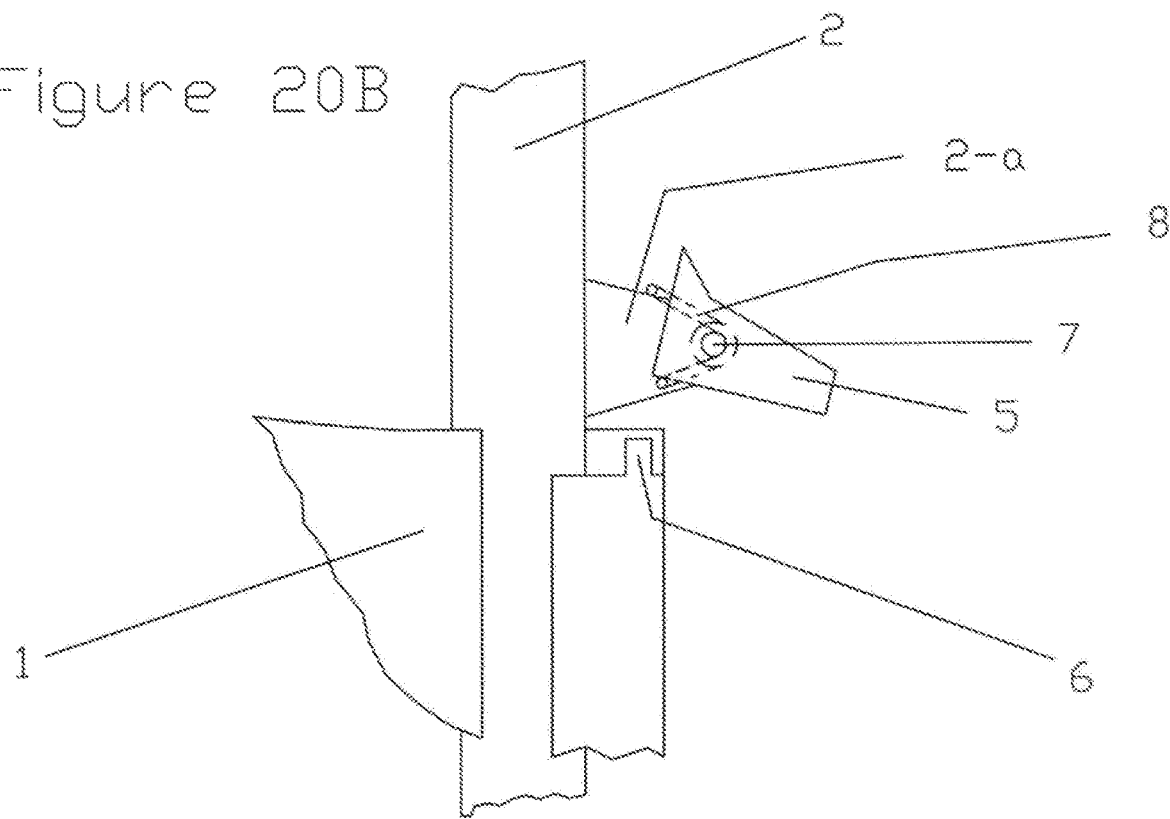
FIG. 20B is an enlarged view of one section of FIG. 20A.

FIGS. 20A and 20B illustrate a case which the movement of the movable part (5) with respect to the sliding pin (2) is a rotational movement.

The invention claimed is:

1. A snap hook comprising:
a main body having a first section that is generally curved and a second section that is generally straight, wherein the first generally curved section comprises a hole and the second generally straight section comprises a cavity;
a sliding pin;
wherein an end of the sliding pin is housed within the hole of the first generally curved section of the main body defining a closed position of the snap hook;
a spring acting on said sliding pin and configured to force the sliding pin towards the closed position;
a slide formed in said main body, wherein the slide comprises different geometric shapes leading to a path, said path defining linear and rotational path sections,
wherein the sliding pin is disposed within the slide and comprises a lever configured to run the path of the slide, and wherein the linear and rotational path sections of the path determine the type of linear and rotational movements of the sliding pin,
wherein by moving the lever, a first movement of the sliding pin begins from the closed position towards an open position of the snap hook, said first movement being an initial linear movement and wherein said open position of the snap hook is defined when the end of the sliding pin is not housed within the hole of the first generally curved section of the main body,
wherein the end of the sliding pin remains partially housed in the hole located in the first generally curved section of the main body during all the initial linear movement, keeping the snap hook closed,
wherein during movement of the sliding pin from the closed position towards the open position of the snap hook, the end of the sliding pin remains partially housed in the hole located in the first generally curved section of the main body during two or more direction changes of the sliding pin caused by the linear and rotational path sections of the path.

2. The snap hook according to the claim 1, wherein the spring is positioned inside the cavity of the main body, wherein an end of the spring contacts another end of the sliding pin and another end of the spring contacts a wall of the cavity opposite the sliding pin.

3. The snap hook according to the claim 1, wherein the path is configured to induce the linear movements, the rotational movements, and/or any combination thereof to the sliding pin.

4. A snap hook comprising:
a main body comprising a first generally curved section, and a second generally straight section, the second generally straight section comprises a cavity;
a sliding pin;
a compression spring acting on said sliding pin;
a stop formed in the main body;
a slide formed in said main body, wherein the slide comprises different geometric shapes leading to a path, said path defining linear and rotational path sections,
wherein the sliding pin is disposed within the slide and comprises a lever configured to run the path of the slide;
a movable part attached to the lever of the sliding pin, wherein the movable part is configured to define an open movable part position and a closed movable part position; and
a resilient element acting on the movable part configured to urge the movable part to the closed movable part position,
wherein by moving the lever, an initial rotational movement of the sliding pin begins from a closed position of the snap hook,
wherein during the initial rotational movement of the sliding pin, the lever is located outside of the slide.

5. The snap hook according to the claim 4, wherein an end of the sliding pin contacts the generally curved section of the main body in the closed position of the snap hook and another end of the sliding pin is inside the cavity of the generally straight section.

6. The snap hook according to the claim 4, wherein the compression spring is positioned inside the cavity of the main body, wherein an end of the spring contacts the another end of the sliding pin and another end of the spring contacts a wall of the cavity opposite the sliding pin.

7. The snap hook according to the claim 4, wherein the movable part in its closed movable part position makes contact with the stop and prevents the sliding pin from rotating upon trying to make the initial rotational movement.

8. The snap hook according to the claim 7, wherein the lever of the sliding pin does not contact the stop during travel of the lever through the path.

9. The snap hook according to the claim 8, wherein, in an instance in which the movable part is moved to the open movable part position, the movable part disengages from the stop of the main body and enables the sliding pin to move freely.

10. The snap hook according to the claim 9, wherein upon disengaging the movable part from the stop, the movable part is configured to return to the closed position.

11. The snap hook according to the claim 10, wherein by changing the position of the movable part, the lever is enabled to make a rotational movement of the sliding pin, wherein the end of the sliding pin is still in contact with the generally curved shape section of the main body during the initial rotational movement of the sliding pin.

12. The snap hook according to the claim 11, wherein the linear and rotational path sections are configured to induce linear movements, rotational movements, and/or any combination thereof of the sliding pin.

13. The snap hook according to the claim 12, wherein at finish of the movements of the sliding pin, the snap hook with spring is enabled to open.

14. The snap hook according to the claim 4, wherein the stop defines a shape configured to block the free movement of the movable part in the closed movable part position.

15. The snap hook according to the claim 14, wherein the stop is configured to block the first movement of the sliding pin via engagement with the movable part in the closed movable part position.

16. The snap hook according to the claim 4, wherein the first generally curved section comprises a hole configured to receive the end of the sliding pin in the closed position of the snap hook.

17. The snap hook according to claim 16, wherein by moving the lever, an initial movement of the sliding pin begins, wherein the end of the sliding pin is still partially housed in the hole located in the first generally curved section of the main body.

* * * * *